(12) United States Patent
Templin et al.

(10) Patent No.: US 10,050,946 B2
(45) Date of Patent: Aug. 14, 2018

(54) SECURED DATA TRANSMISSION USING IDENTITY-BASED CRYPTOGRAPHY

(71) Applicant: THE BOEING COMPANY, Chicago, IL (US)

(72) Inventors: Fred L. Templin, North Bend, WA (US); Kapaleeswaran Viswanathan, Bangalore (IN)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 15/186,237

(22) Filed: Jun. 17, 2016

(65) Prior Publication Data

US 2017/0366520 A1 Dec. 21, 2017

(51) Int. Cl.
*H04L 29/06* (2006.01)
*H04L 9/08* (2006.01)
(Continued)

(52) U.S. Cl.
CPC ........ *H04L 63/0471* (2013.01); *H04L 9/0822* (2013.01); *H04L 9/0825* (2013.01);
(Continued)

(58) Field of Classification Search
CPC ... H04L 63/0471; H04L 63/062; H04L 9/006; H04L 9/0822; H04L 9/0847;
(Continued)

(56) References Cited

U.S. PATENT DOCUMENTS

| 8,108,678 B1* | 1/2012 | Boyen | H04L 9/0847 380/30 |
| 2003/0115448 A1* | 6/2003 | Bouchard | H04L 63/04 713/153 |

(Continued)

OTHER PUBLICATIONS

Asokan et al., "Applicability of Identity-Based Cryptography for Disruption-Tolerant Networking" AMC Digital Library, Jun. 2007, pp. 52-56, https://dl.acm.org/citation.cfm?id=1247705 (Year: 2007).*

(Continued)

*Primary Examiner* — Jung W Kim
*Assistant Examiner* — Carlos M De Jesus Lassala
(74) *Attorney, Agent, or Firm* — Womble Bond Dickinson (US) LLP

(57) ABSTRACT

A system is provided for secure data transmission. The system stores a public master key, private decryption key and secure messaging module for securely transmitting and receiving a digital model data file for transmission via a work order message. For transmitting and receiving the work order message, the system generate public encryption keys using a key generation algorithm in which each of the public encryption keys are unique to a designated message recipient and generated using an input including the public master key, a validity period, and an identifier of the designated message recipient. The system may also store a revocation list that includes identifiers of message recipients that have revoked access to the public master key or private decryption key, and based thereon determine whether or not to encrypt and transmit the work order message, or receive and decrypt the work order message.

21 Claims, 12 Drawing Sheets

(51) Int. Cl.
*H04L 9/32* (2006.01)
*H04L 9/00* (2006.01)

(52) U.S. Cl.
CPC .......... *H04L 9/0847* (2013.01); *H04L 9/0861* (2013.01); *H04L 9/0891* (2013.01); *H04L 9/3263* (2013.01); *H04L 9/3268* (2013.01); *H04L 63/0442* (2013.01); *H04L 63/068* (2013.01); *H04L 9/006* (2013.01); *H04L 63/0281* (2013.01); *H04L 63/04* (2013.01); *H04L 63/062* (2013.01)

(58) Field of Classification Search
CPC . H04L 9/0891; H04L 9/0861; H04L 63/0281; H04L 63/04; H04L 9/30; H04L 9/3263; H04L 9/3268; H04L 9/0825
See application file for complete search history.

(56) References Cited

U.S. PATENT DOCUMENTS

| | | | |
|---|---|---|---|
| 2003/0179885 A1* | 9/2003 | Gentry | H04L 9/0836 380/277 |
| 2005/0138353 A1* | 6/2005 | Spies | H04L 63/0442 713/153 |
| 2006/0095771 A1* | 5/2006 | Appenzeller | H04L 9/006 713/171 |

OTHER PUBLICATIONS

Templin et al., "DTN Security Key Management—Requirements and Design", internet draft, Boeing Research & Technology, Feb. 2015, pp. 1-12 https://tools.ietf.org/html/draft-templin-dtnskmreq-00 (Year: 2015).*

Viswanathan et al., "Architecture for a Delay-and-Disruption Tolerant Public-key Distribution Network" internet draft, Boeing Research & Technology, Mar. 2016, pp. 1-18 (provided by applicants) (Year: 2016).*

"ID-based cryptography", Wikipedia, https://en.wikipedia.org/wiki/ID-based_cryptography, Retrieved Oct. 18, 2016, pp. 1-2.

Viswanathan et al., "Architecture for a Delay-and-Disruption Tolerant Public-Key Distribution Network (PKDN)", Network Working Group Internet-Draft, Boeing Research & Technology, https://tools.ietf.org/html/draft-viswanathan-dtnwg-pkdn-00, Aug. 27, 2015, pp. 1-19.

* cited by examiner

SECURED DATA TRANSMISSION USING IDENTITY-BASED CRYPTOGRAPHY

TECHNOLOGICAL FIELD

The present disclosure relates generally to secured data transmission and, in particular, secured data transmission using identity-based cryptography.

BACKGROUND

Significantly delayed and disrupted data transmissions are common within many environments such as those involving space, unmanned aerial vehicles, unmanned submarine vehicles and the like. In these environments, data being transmitted from a data source to a destination is further delayed when prior external communications (e.g., an exchange of cryptography keys) are required before successful transmission of the data.

Currently, two common techniques are utilized for cryptography key distribution. In one technique, a source queries a third-party device or a destination for the destinations key; and in another technique, the third-party device pushes keys for all authorized destinations to all of the senders. While the latter technique requires less interaction than the former, both techniques require at least one communication before the source can securely transmit data to the destination. As previously indicated, these techniques are not ideal for use in environments having significantly delayed and disrupted data transmissions. Moreover, the latter technique is not useful in opportunistic or ad-hoc networks in which access to data transmissions is highly intermittent.

Therefore, it may be desirable to have a system and method that take into account at least some of the issues discussed above, as well as possibly other issues.

BRIEF SUMMARY

Example implementations of the present disclosure are directed to an improved system, secure message transmission device, method and computer-readable storage medium for secured data transmission and automated performance of operations by an operational system based thereon. In particular, the system securely transmits data between end-point computers and end-point operational systems without requiring an exchange of authorization credentials (e.g., cryptography keys) between either the end-point devices or a third-party device prior to transmitting the data.

In some example implementations, a system is provided for secured data transmission and automated performance of operations by an operational system based thereon. The system comprises an end-point computer configured to generate a digital model data file for transmission via a work order message, and an end-point operational system configured to receive the work order message including the digital model data file. The system also comprises at least two secure message transmission devices (SMTDs) respectively connected to the end-point computer and the end-point operational system.

Each SMTD of the at least two STMDs includes a network port connected to a communication network to permit transmission of the work order message between the end-point computer and the end-point operational system via the communication network; a non-volatile storage medium storing a public master key for use in creating an encryption key, a private decryption key, a revocation list including identifiers of message recipients having revoked access to the public master key or private decryption key, and a secure messaging module; and a processor configured to execute the secure messaging module and a key generator module.

The key generator module is configured to generate, using a key generation algorithm, one or more public encryption keys in which each of the one or more public encryption keys are unique to a designated message recipient and generated using an input including the public master key, a validity period, and an identifier of the designated message recipient.

For the SMTD connected to the end-point computer, the secure messaging module is configured to receive the work order message from the end-point computer for transmission to the designated message recipient; and if the identifier of the designated message recipient matches an identifier within the revocation list, delete the work order message and transmit a message to notify a user at the end-point computer of a failed transmission of the work order message; and if the identifier of the designated message recipient does not match an identifier within the revocation list, effect generation at the SMTD of an ephemeral copy of a public encryption key, encrypt the work order message using the ephemeral copy of the public encryption key, and transmit the work order message to the end-point operational system through the network port. The public encryption key is generated using the key generator module and inputs including the public master key, a validity period, and an identifier of the designated message recipient.

For the SMTD connected to the end-point operational system, the secure messaging module is configured to receive the work order message from the network port for transmission to the designated message recipient; and if the identifier of the designated message recipient matches an identifier within the revocation list, delete the work order message and transmit a message to notify a user at the end-point computer of a failed transmission of the work order message; and if the identifier of the designated message recipient does not match an identifier within the revocation list, decrypt the work order message using the private decryption key and transmit the work order message to the end-point operational system. Upon receipt of the work order message, the end-point operational system is configured to use the digital model data file therein to perform an operation for implementing an object represented by the digital model data file.

In some example implementations of the system of the preceding or any subsequent example implementation, or any combination thereof, the digital model data file and the object represented thereby include a three-dimensional (3D) model for a structural part, the end-point operational system is a 3D-printer, and the end-point operational system being configured to perform the operation includes being configured to perform a 3D printing operation for creating the structural part from the 3D model.

In some example implementations of the system of any preceding or any subsequent example implementation, or any combination thereof, the digital model data file and the object represented thereby include a digital surface model and target and navigation information for a mission, the end-point operational system is an autonomous unmanned aerial vehicle, and the end-point operational system being configured to perform the operation includes being configured to perform an operation for navigating the autonomous unmanned aerial vehicle to the target for the mission in the digital surface model.

In some example implementations of the system of any preceding or any subsequent example implementation, or any combination thereof, the ephemeral copy of the public encryption key is not a duplicate of any public encryption key stored by a third-party directory of public encryption keys.

In some example implementations of the system of any preceding or any subsequent example implementation, or any combination thereof, the key generation algorithm is an asymmetric key generation algorithm, and the secure messaging module being configured to encrypt the work order message includes being configured to encrypt the work order message using an asymmetric encryption algorithm.

In some example implementations of the system of any preceding or any subsequent example implementation, or any combination thereof, a respective SMTD of the at least two SMTDs is operatively coupled to an access granting module configured to receive an identifier, an address and proof of identification associated with the respective SMTD and based thereon, generate the private decryption key, the private decryption key being unique to the respective SMTD, and generate the public master key and an access denial master key for use in verifying revoked access to the public master key or the private decryption key. The private decryption key, public master key and access denial master key are configured for storage in the non-volatile memory.

In some example implementations of the system of any preceding or any subsequent example implementation, or any combination thereof, the respective SMTD of the at least two SMTDs is further operatively coupled to an access denying module configured to transmit a revocation message to the respective SMTD indicating at least one message recipient having revoked access to the public master key or private decryption key. The respective SMTD being thereby configured to receive and verify validity of the revocation message based at least in part on the access denial master key, and in response to verifying validity of the revocation message, update the revocation list to include an identifier of the at least one message recipient.

In some example implementations, a method is provided for secured data transmission and automated performance of operations by an operational system based thereon at a secure message transmission device (SMTD) connected to an end-point computer configured to generate a digital model data file for transmission via the work order message, or an end-point operational system configured to receive the work order message including the digital model data file. The method comprises transmitting or receiving, through a network port and via a communication network, the work order message between the end-point computer and the end-point operational system.

Transmitting or receiving the work order message includes storing, in a non-volatile storage medium, a public master key for use in creating an encryption key, a private decryption key, and a revocation list including identifiers of message recipients having revoked access to the public master key or private decryption key; and generating, using a key generation algorithm, one or more public encryption keys, each of the one or more public encryption keys being unique to a designated message recipient and generated using an input including the public master key, a validity period, and an identifier of the designated message recipient.

For the SMTD connected to the end-point computer, the method further comprises receiving the work order message from the end-point computer for transmission to the designated message recipient; and if the identifier of the designated message recipient matches an identifier within the revocation list, deleting the work order message and transmitting a message to notify a user at the end-point computer of a failed transmission of the work order message; and if the identifier of the designated message recipient does not match an identifier within the revocation list, effecting generation of an ephemeral copy of a public encryption key, encrypting the work order message using the ephemeral copy of the public encryption key, and transmitting the work order message to the end-point operational system through the network port. The public encryption key is generated using inputs including the public master key, a validity period, and an identifier of the designated message recipient.

For the SMTD connected to the end-point operational system, the method further comprises receiving the work order message from the network port for transmission to the designated message recipient; and if the identifier of the designated message recipient matches an identifier within the revocation list, deleting the work order message and transmitting a message to notify a user at the end-point computer of a failed transmission of the work order message; and if the identifier of the designated message recipient does not match an identifier within the revocation list, decrypting the work order message using the private decryption key and transmitting the work order message to the end-point operational system. Upon receipt of the work order message, the end-point operational system is configured to use the digital model data file therein to perform an operation for implementing an object represented by the digital model data file.

In some example implementations of the method of the preceding or any subsequent example implementation, or any combination thereof, the digital model data file and the object represented thereby include a three-dimensional (3D) model for a structural part, the end-point operational system is a 3D-printer, and the end-point operational system being configured to perform the operation includes being configured to perform a 3D printing operation for creating the structural part from the 3D model.

In some example implementations of the method of any preceding or any subsequent example implementation, or any combination thereof, the digital model data file and the object represented thereby include a digital surface model and target and navigation information for a mission, the end-point operational system is an autonomous unmanned aerial vehicle, and the end-point operational system being configured to perform the operation includes being configured to perform an operation for navigating the autonomous unmanned aerial vehicle to the target for the mission in the digital surface model.

In some example implementations of the method of any preceding or any subsequent example implementation, or any combination thereof, the ephemeral copy of the public encryption key is not a duplicate of any public encryption key stored by a third-party directory of public encryption keys.

In some example implementations of the method of any preceding or any subsequent example implementation, or any combination thereof, the key generation algorithm is an asymmetric key generation algorithm, and encrypting the work order message includes encrypting the work order message using an asymmetric encryption algorithm.

In some example implementations of the method of any preceding or any subsequent example implementation, or any combination thereof, the method further comprises, at an access granting module connected to the SMTD, receiving an identifier, an address and proof of identification associated with the respective SMTD, and based thereon, generating the private decryption key, the private decryption key being unique to the respective SMTD, and generating the public master key and an access denial master key for use in verifying revoked access to the public master key or the private decryption key. The private decryption key, public master key and access denial master key are configured for storage in the respective SMTD.

In some example implementations of the method of any preceding or any subsequent example implementation, or any combination thereof, the method further comprises, at an access denying module connected to the SMTD, transmitting a revocation message to the respective SMTD indicating at least one message recipient having revoked access to the public master key or private decryption key, and at the respective SMTD receiving and verifying validity of the revocation message based at least in part on the access denial master key, and in response to verifying validity of the revocation message, updating the revocation list to include an identifier of the at least one message recipient.

In some example implementations, a secure message transmission device is provided. The SMTD comprises a processor and a memory storing executable instructions that, in response to execution by the processor, cause the SMTD to implement a number of modules, such as a secure messaging module and key generator module that may be configured to at least perform the method of any preceding example implementation, or any combination thereof.

In some example implementations, a computer-readable storage medium is provided for secured data transmission and automated performance of operations by an operational system based thereon. The computer-readable storage medium is non-transitory and has computer-readable program code portions stored therein that, in response to execution by a processor, cause an SMTD to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIG. 1A illustrates a secured data transmission system, according to example implementations of the present disclosure;

FIG. 1B more particularly illustrates the secured data transmission system of FIG. 1, according to example implementations of the present disclosure;

DETAILED DESCRIPTION

Figure 1A:
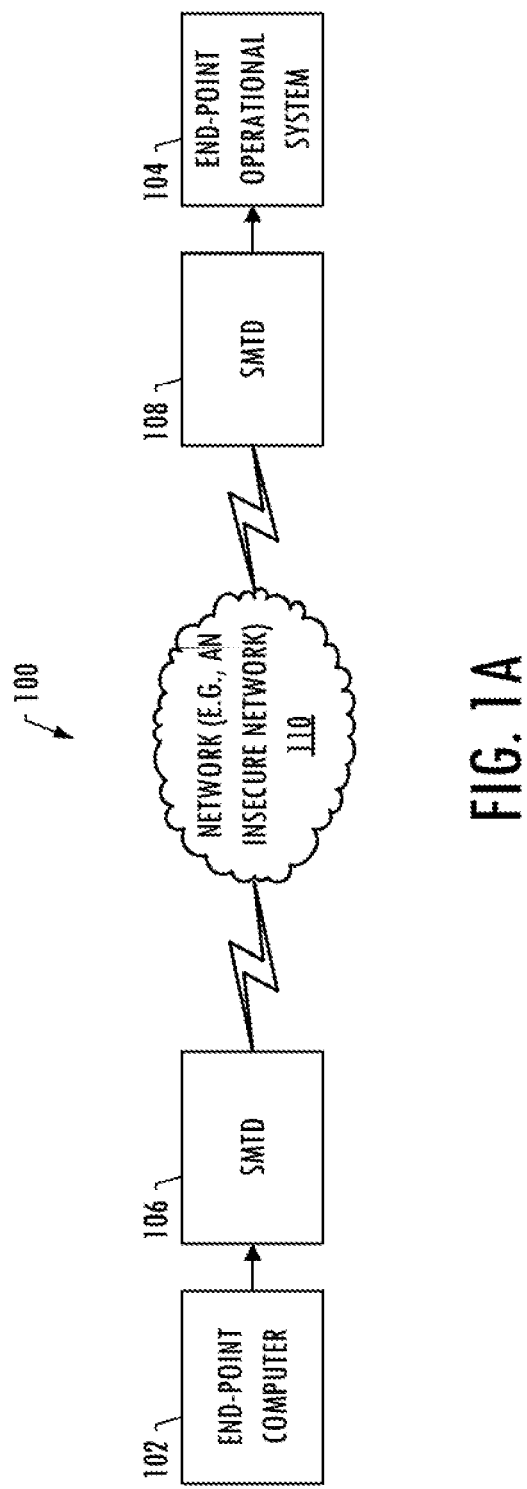

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to data networking and, in particular, to secure data transmission using identity-based cryptography for effecting automated performance of an operational system. Example implementations will be primarily described in conjunction with data networking and cryptography applications. It should be understood, however, that example implementations may be utilized in conjunction with a variety of other applications not explicitly contemplated herein.

The system of the present disclosure benefits secure data transmission within various data networks such as those that include unmanned aerial vehicles and communications between other autonomous entities such as unmanned submarine vehicles and mobile devices with intermittent communication connectivity. The system leverages non-interactive security key management protocols for effecting delayed and disruption-tolerant secure data transmissions.

In particular, the system of the present disclosure includes structural components such as a secure computing device configured to function as a source or sender to send confidential information over long-delay and highly-disrupted networks, and a secure computing device configured to function as a destination or recipient to receive confidential information from one or more senders. The system also utilizes architectural entities that include an identification-based key authority that validates the identity and address of the receiver using out-of-band communication mechanisms, and then enables the receiver to generate a private (or secret) key corresponding to the receiver's address. As a result of knowing the designated recipient's or receiver's address, any entity can send confidential messages to the receiver. However, only the receiver can read the confidential message using their respective private key. The architectural entities also utilize a revocation authority that generates and transmits messages that indicate which recipient's or receiver's keys have been revoked and must not be used for transmitting confidential communication by the secure computing devices. The architectural entities may directly or indirectly receive key revocation updates from the revocation authority, and may also receive confidential messages from a sender to a destination of a designated recipient. If the confidential messages were created designating a revoked receiver's address, the confidential messages are deleted and the sender is accordingly informed of such action. If the confidential messages were created and sent to an unrevoked recipient or receiver's addresses, the messages are forwarded to the receivers.

FIG. 1A illustrates a system for secured data transmission 100 according to example implementations of the present disclosure, which may be simply referred to as the "system" herein. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

In accordance with example implementations of the present disclosure, the system 100 is configured to perform various functions or operations to securely transmit data and thereby effect automated performance of operations by an operational system. The system is configured to generate and receive a digital model data file for transmission via a work order message, where an end-point operational system uses the digital model data file therein to perform an operation for implementing an object represented by the digital model data file. The system stores a public master key, private decryption key and secure messaging module for securely transmitting and receiving data. For transmitting the work order message to a recipient who is verified not to be revoked, the system includes a secure messaging device configured to generate, at the secure messaging device, ephemeral copies of public encryption keys using a key generation algorithm in which each of the public encryption keys are unique to a designated message recipient and generated using an input including the public master key, a validity period, and an identifier of the designated message recipient. The system also stores a revocation list that includes identifiers of message recipients that have revoked access to the public master key or private decryption key, and based thereon the secured messaging devices determine whether or not to encrypt and transmit the work order message, or receive and decrypt the work order message.

The system 100 may include one or more of each of a number of different subsystems (each an individual system) coupled to one another for performing one or more functions or operations. As shown in FIG. 1A, for example, the system may include an end-point computer 102, end-point operational system 104 and/or at least two (2) secure message transmission device(s) (SMTD) 106, 108 that may be in communication via a network 110 with one another. In these example implementations, the network may include an insecure network through which data may be securely transmitted using the at least two SMTDs. It should be understood that one or more of the subsystems may function or operate as a separate system without regard to others of the subsystems. And further, it should be understood that the system may include one or more additional or alternative subsystems than those shown in FIG. 1A.

As explained in greater detail below, the end-point computer 102, end-point operational system 104, and SMTDs 106, 108 may be configured to perform respective functions or operations of the system 100. The end-point computer may be configured to generate a digital model data file for transmission via a work order message, and the end-point operational system may be configured to receive the work order message including the digital model data file and use the digital model data file therein to perform an operation for implementing an object represented by the digital model data file. The SMTDs may be respectively coupled to the end-point computer and end-point operational system, and further coupled to one another for transmitting the work order message therebetween. The digital model data file may include, for example, a three-dimensional (3D) part model, digital surface model, digital terrain model or digital contour map. The work order message may include, for example, a job, service or mission order.

Figure 1B:
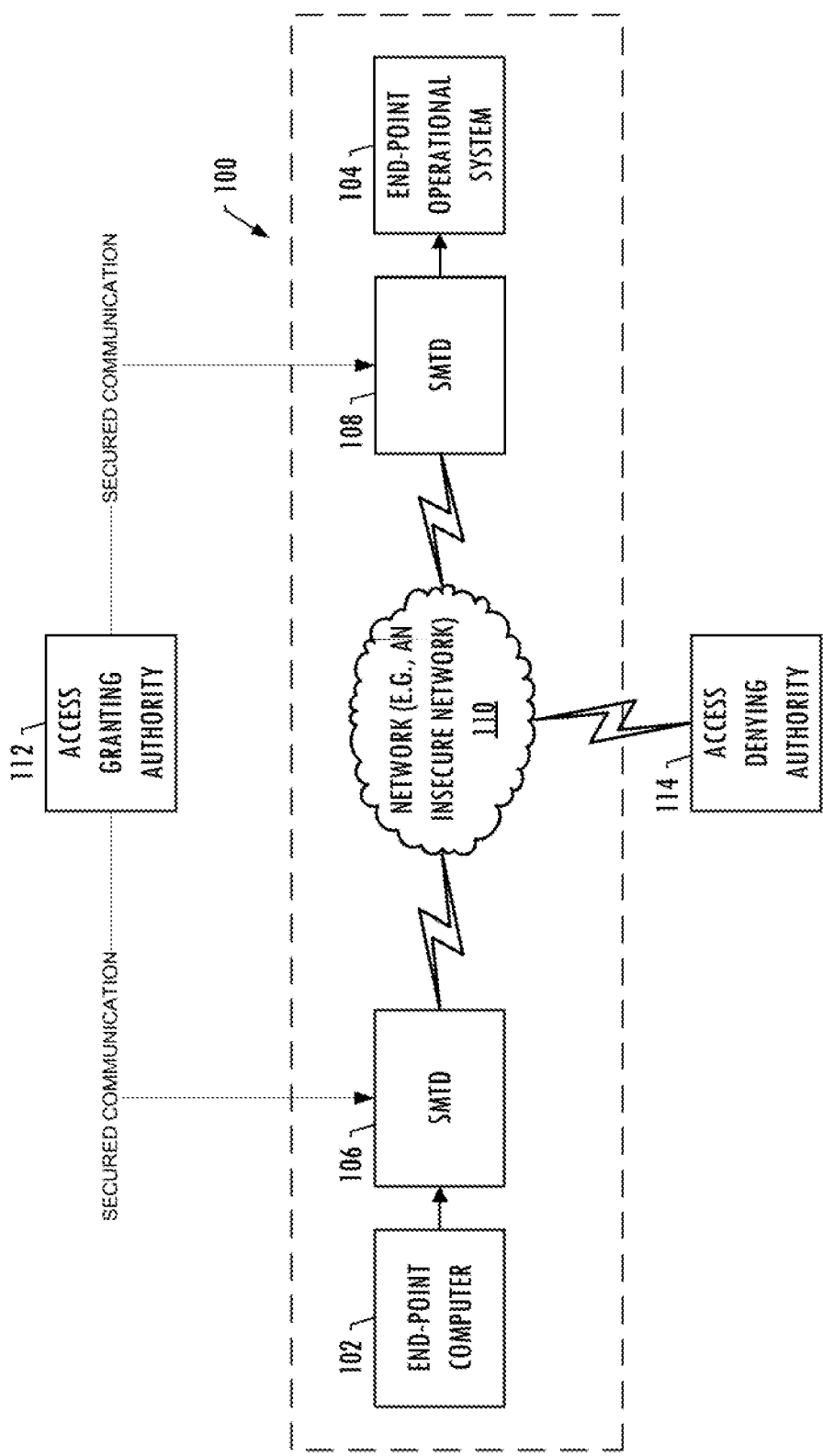

FIG. 1B illustrates a more particular example of the system 100 of FIG. 1A, according to example implementations of the present disclosure. As shown, the system may communicate with an access granting authority 112 directly coupled to each of the at least two SMTDs 106, 108. The access granting authority may communicate with the SMTDs via a secured communication mechanism configured to securely transmit data independent of an SMTD such via a physical data courier. The system may further communicate with an access denying authority 114 in communication with the at least two SMTDs via the network 110, that is the access denying authority may communicate with the SMTDs over an insecure network. It should be noted that as used herein an "authority" may refer to a system or server configured to perform a number of different functions or operations, either automatically, under direct operator control, or some combination of thereof.

The access granting authority 112 may execute an access granting module configured to receive credentials associated with a respective SMTD such as an identifier, an address, and proof of identification of the respective SMTD. Based thereon, the access granting module may be configured to generate and provide to the respective SMTD a private decryption key that is unique to the respective SMTD, and further generate and provide a public master key and an access denial master key for use in verifying revoked access to the public master key or the private decryption key.

The access denying authority 114 may execute an access denying module configured to transmit a revocation message to the respective SMTD that indicates at least one message recipient having revoked access to the public master key or private decryption key. As discussed in greater detail below, the private decryption key, public master key and access denial master key are provided to and stored in a storage medium in the respective SMTD, and upon receiving the revocation message from the access denying authority, the respective SMTD is configured to verify validity of the revocation message based at least in part on the access denial master key. In response to verifying validity of the revocation message, the SMTD may update a revocation list stored in the storage medium to include an identifier of the at least one message recipient.

Figure 2:
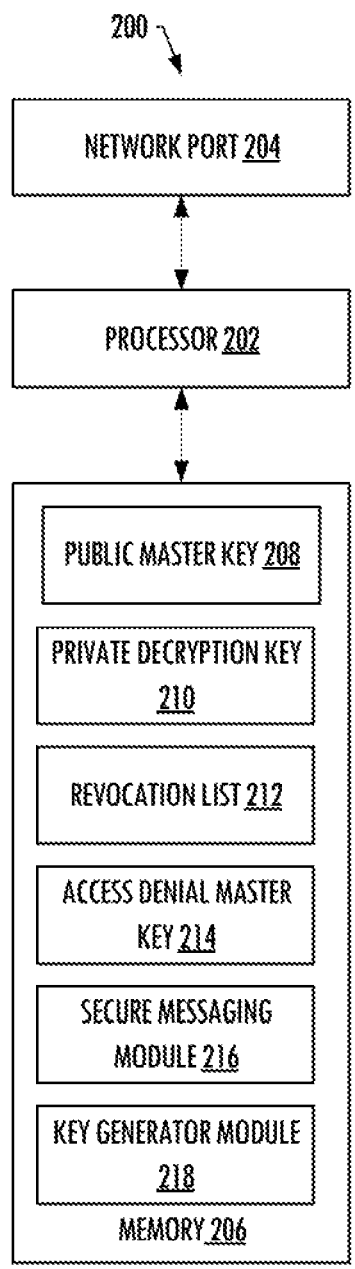
FIG. 2 illustrates a suitable secure message transmission device, according to example implementations of the present disclosure.
Figure 3:
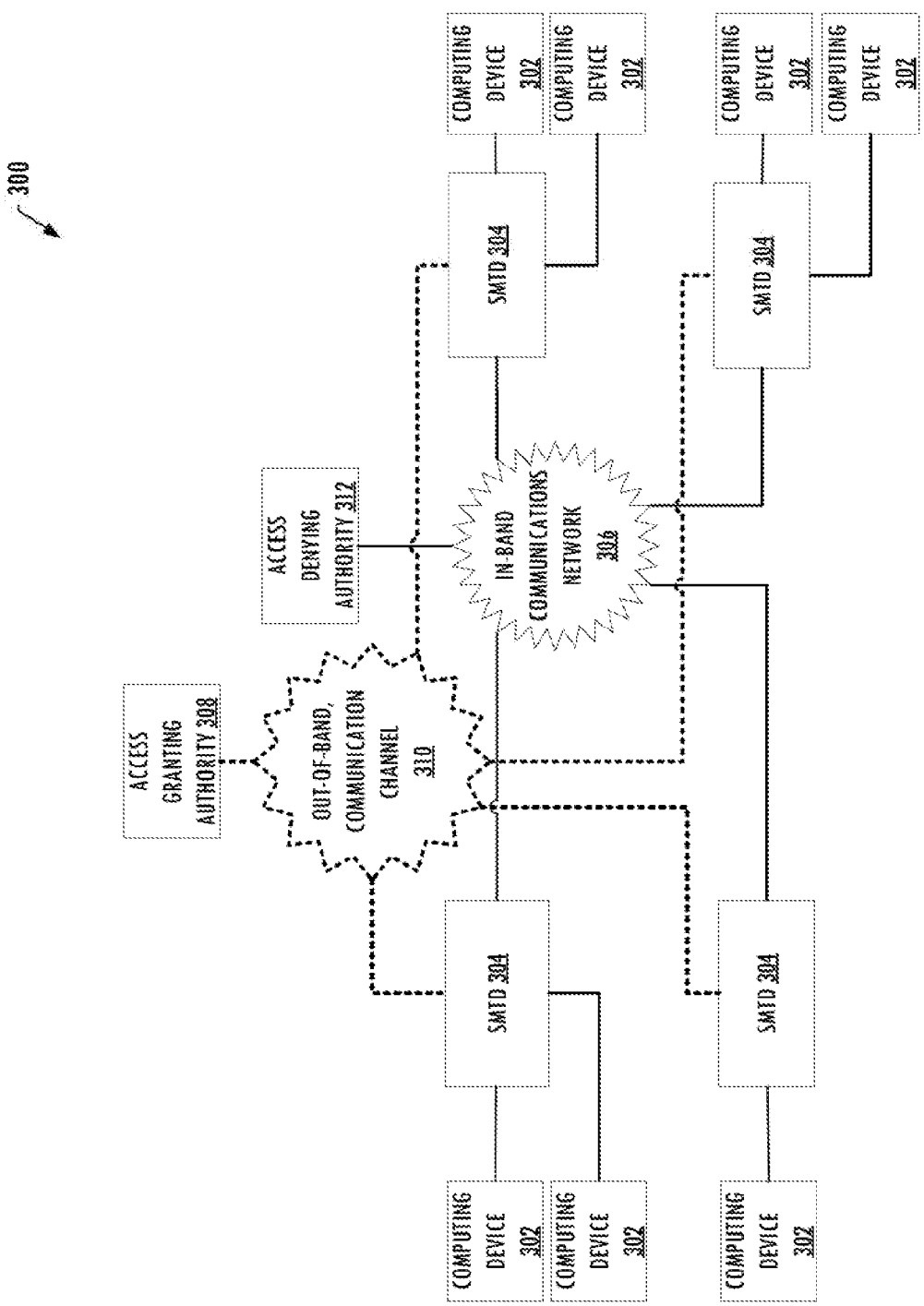
FIGS. 3, 4, 5 and 6 illustrate a suitable secured data transmission system, according to examples implementations of the present disclosure.

FIG. 2 illustrates a suitable example of an SMTD 200 that may in some examples correspond to the SMTDs 106, 108 of FIGS. 1A and 1B. As shown, the SMTD may include a processor 202 operatively coupled to a network port 204 and memory 206 (e.g., a non-volatile storage medium). The network port may be connected to a communication network to permit transmission of a work order message between the end-point computer 102 and the end-point operational system 104 via the communication network. As previously discussed herein, the memory stores a public master key 208 for use in creating a public encryption key, a private decryption key 210 for use in decrypting an encrypted message, a revocation list 212 that includes identifiers of message recipients having revoked access to the public master key or private decryption key, and an access denial master key 214 for validating the revoked access thereof. The memory also stores a secure messaging module 216 and a key generator module 218.

The processor 202 is configured to execute the secure messaging module 216 and the key generator module 218. The key generator module is configured to generate public encryption keys using a key generation algorithm (e.g., an asymmetric key generation algorithm). Each of the public encryption keys is unique to a designated message recipient (e.g., an intended message recipient of a work order message) and generated using an input that includes the public master key 208, a validity period, and an identifier of the designated message recipient.

In instances in which the SMTD 200 (e.g., SMTD 106) is connected to the end-point computer 102, the secure messaging module 216 is configured to receive a work order message from the end-point computer for transmission to the designated message recipient. In these examples, if the identifier of the designated message recipient matches or corresponds to an identifier within the revocation list 212, the secure messaging module is configured to delete the work order message and may transmit a message to notify a user at the end-point computer of a failed transmission of the work order message. In particular, the SMTD may receive a revocation message from the access denying authority 114 that indicates revoked access for a designated message recipient. The authenticity of the message may be validated using the access denial master key 214, and the SMTD thereby updates the revocation list to include an identifier of the recipient.

Further in these examples, if the identifier of the designated message recipient does not match or correspond to an identifier within the revocation list 212 stored in the memory medium of the secure messaging module 216, the secure messaging module 216 is configured to execute the key generator module to effect generation, locally at the SMTD, of an ephemeral copy of a public encryption key that is unique to the designated message recipient in which the public encryption key is generated using the key generator module 218 and inputs including the public master key 208, a validity period, and an identifier of the designated message recipient. In these examples, the ephemeral copy of the public encryption key is not a duplicate of any public encryption key stored by a third-party directory of public encryption keys. The secure messaging module 216 then encrypts the work order message using the ephemeral copy of the public encryption key, and transmits the work order message to the end-point operational system 104 via the network port 204. In some examples, the secure messaging may be configured to encrypt the work order message using an asymmetric encryption algorithm. Each secure messaging module 216, when executed by the SMTD 200, is configured to determine if the designated recipient for the work order message corresponds to an identifier of a message recipient in the locally stored revocation list, by comparing at least a portion of the designated recipient's alpha-numeric address that corresponds to an identifier of a message recipient in the revocation list, where the messaging module parses portions of the designated recipient's address for comparison to the stored identifier.

The SMTD 200 accordingly enables locally generating encryption keys for a designated recipient without requiring maintenance and storage in memory of a large directory of public encryption keys corresponding to an extensive number of recipients who are verified to be secure (e.g., non-revoked). These example implementations may also enable sending work order messages to trusted recipients without being required to maintain and store in memory a large directory of the numerous trusted recipients, which may be substantially larger than a list of non-trusted recipients (e.g., the revocation list 212). This results in more efficient data storage allocation and processing times for secure data transmission.

In instances in which the SMTD 200 (e.g., SMTD 108) is connected to the end-point operational system 104, the secure messaging module 216 may be configured to receive the work order message via the network port 204 for transmission to the designated message recipient. In these examples, if the identifier of the designated message recipient matches or corresponds to an identifier within the revocation list 212, the secure messaging module may be configured to delete the work order message and transmit a message to notify a user at the end-point computer of a failed transmission of the work order message. Further in these examples, if the identifier of the designated message recipient does not match or correspond to an identifier within the revocation list, the secure messaging module may be configured decrypt the work order message using the private decryption key 210 stored locally in the memory medium of the SMTD 200 and transmit the work order message to the end-point operational system.

As previously indicated, upon receipt of the work order message, the end-point operational system 104 is configured to use the digital model data file therein, by executing or loading the digital model data file in an associated application, to perform an operation for implementing an object represented by the digital model data file. In some examples, the digital model data file and the object represented thereby include a three-dimensional (3D) model for a structural part. In these examples, the end-point operational system may be or include a 3D-printer configured to perform a 3D printing operation for creating the structural part from the 3D model.

In some examples, the digital model data file and the object represented thereby include a digital surface model and target and navigation information for a mission. In these examples, the end-point operational system 104 may be or include an autonomous unmanned aerial vehicle configured to perform an operation for navigating the autonomous unmanned aerial vehicle to the target for the mission in the digital surface model.

As previously indicated, the system 100 of the present disclosure may be used in conjunction with various applications within the context of data networking. For example, in one specific implementation, a number of manufacturers may require structural parts that are created through 3D printing. In these examples, a number of suppliers that produce on-demand 3D printed parts may agree to form a trade group to provide a means for the manufacturers to securely order the 3D printed parts from the suppliers. Upon joining the trade group, a manufacturer and/or supplier may receive a SMTD 200 that may be connected to and between a network (e.g., the Internet) and their respective computing devices.

The SMTD 200 may include software for initially configuring the device. Configuring the SMTD may include the user using the software to download a key generator module 218 that may be installed on the SMTD and shared by all members of the trade group. The user may also download a public master key 208 that may also be shared by all members of the trade group, and a private decryption key 210 that may be unique to the SMTD and valid for only a predetermined period of time (e.g., the current calendar month). The public master key and private decryption key may each be locally stored in memory 206 of the SMTD.

Members of the trade group may use their respective address such as a domain name (e.g., mycompanyname.com) as their identifier. In some examples, the members' respective SMTD 200 address may include a domain name of the trade group concatenated by a subdomain including the domain name of the member (e.g., tradegroup.mycompanyname.com).

Upon configuring the SMTD 200, a manufacturer may prepare a digital model data file on a computing device connected to their SMTD. For example, a manufacturer may prepare a 3D model for a structural part on an end-point computer 102 connected to their SMTD 106. The digital model data file may then be securely transmitted to any supplier within the trade group, by way of the connected SMTD that is configured to sign, encrypt, and transmit a message including the digital model data file to a supplier without a need to connect or synchronize data with a third-party entity. It should, however, be noted that in some instances the SMTD may be required to periodically synchronize data with a third-party entity such as to obtain new private decryption keys on a monthly basis from the access granting authority 112. Upon receipt, the suppliers end-point operational system 104 (e.g., a 3D printer) will print the part as prescribed in the digital model data file.

If it is determined that a private decryption key 210 for a supplier has been stolen, and thereby a created a risk that digital model data files (e.g., 3D models for structural parts) being sent to the supplier may be intercepted and decrypted, the access denying authority 114 may transmit a notice of revocation to the SMTDs 200 within the trade group. The SMTDs may then automatically delete messages sent to the specified supplier, and notify users (on the computing devices connected to the respective SMTDs) that secure ordering with the supplier has been terminated, and will resume at a later time such as the beginning of the next calendar month when the supplier requests and obtains a new private decryption key 210.

In another example implementation, a number of wholesale enterprises, and a number of delivery companies that provide fully-automated, 24-hour pick-up and delivery services may agree to form a trade group to provide a means for the wholesale enterprises to securely order pick-up and delivery of goods. In some instances, an order may be for pick-up from a manufacturer and delivery to a wholesale warehouse, and in other instances the order may be for pick-up from a wholesale warehouse and for delivery to a retailer. Upon joining the trade group, a wholesale enterprise and/or delivery company may receive a SMTD 200 that may be connected to and between a network (e.g., the Internet) and their respective computing devices, and configured similar to the SMTD of the prior example implementation.

Upon configuring the SMTD 200, a wholesale enterprise may prepare a pick-up and/or delivery order on a computing device connected to their SMTD. The order may then be securely transmitted to any delivery company within the trade group, by way of the connected SMTD that is configured to sign, encrypt, and transmit a message including the order to a delivery company. Upon receipt, the delivery company's end-point operational system 104 may automatically dispatch an autonomous vehicle as specified by the pick-up and/or delivery order.

If it is determined that a private decryption key 210 for a delivery company has been redirected or stolen, the access denying authority 114 may transmit a notice of revocation to the SMTDs 200 within the trade group. The SMTDs may then automatically delete messages sent to the specified delivery company, and notify users (on the computing devices connected to the respective SMTDs) that secure ordering with the delivery company has been terminated. In some instances, if the delivery company requests a new private decryption key 210 at the beginning of the next calendar month, without restoring membership in the trade group, the request may be ignored.

In yet another example implementation, a number of retail stores may form a trade group with a leasing company that rents autonomous aerial delivery devices that the retail stores may use to schedule pick-up of packages at the retail locations and delivery to the recipients' location. Upon joining the trade group, a retail store and/or the leasing company may receive a SMTD 200 that may be connected to and between a network (e.g., the Internet) and their respective computing devices, and configured similar to the SMTDs of the prior example implementations.

Upon configuring the SMTD 200, a retail store may transmit a request to the leasing company to use the autonomous aerial delivery device for a predetermined period of time. If an aerial delivery device is available, the leasing company may respond with a federal aviation administration (FAA) tail-number of the rented autonomous aerial delivery device. The leasing company may use their respective address such as a domain name (e.g., leasingcompany.com) as an identifier, and the SMTD 200 may be provisioned to use as an identifier and address, the FAA tail-number concatenated by a subdomain including the domain name of the leasing (e.g., tail-number.leasingcompany.com). The SMTD may therefore be configured with a private decryption key 210 based on the tail-number as an identifier and the rental period as a period of validity.

Using these configuration parameters, the retail store may create a delivery order on a computing device connected to their SMTD 200, and the order may then be securely transmitted to an autonomous aerial delivery device, by way of the connected SMTD that is configured to sign, encrypt, and transmit a message including the delivery order to an autonomous aerial delivery device. Upon receipt, the autonomous aerial delivery device may automatically pick-up and deliver the retail goods as directed in the delivery order. It should be noted that any retail store of the trade group, could conceivably transmit delivery orders to any rented autonomous aerial delivery devices. The autonomous aerial delivery devices may be configured to validate the retail store's digital signature as attached to the delivery order by the retail store's respective SMTD, and thereby only accept orders from the retail store that the autonomous aerial delivery device has been assigned to as a result of a rental agreement.

To further illustrate example implementations of the present disclosure, reference will now be made to FIGS. 3, 4, 5 and 6, which illustrate a suitable system for secured data transmission 300 that may be a more particular example of the system 100 of FIGS. 1A and 1B. As shown, the system may include a number of computing devices 302 (e.g., end-point computer 102 or end-point operational system 104) connected to respective SMTDs 304 (e.g., SMTD 106, 108) in which multiple computing devices may be connected to a single SMTD. The SMTDs may be interconnected by an insecure in-band communications network 306 or communication medium such as the Internet. Additionally, the SMTDs may have access to an access granting authority 308 (e.g., access granting authority 112) over a secure out-of-band, point-to-point communication channel 310. The out-of-band communication channel may be or include a physical data courier such as a universal serial bus (USB) flash drive. The access granting authority enables an SMTD to securely send or receive messages from other SMTDs. An access denying authority 312 (e.g., access denying authority 114) may revoke access for an SMTD by sending revocation messages to other SMTDs via the in-band communications network.

Figure 4:
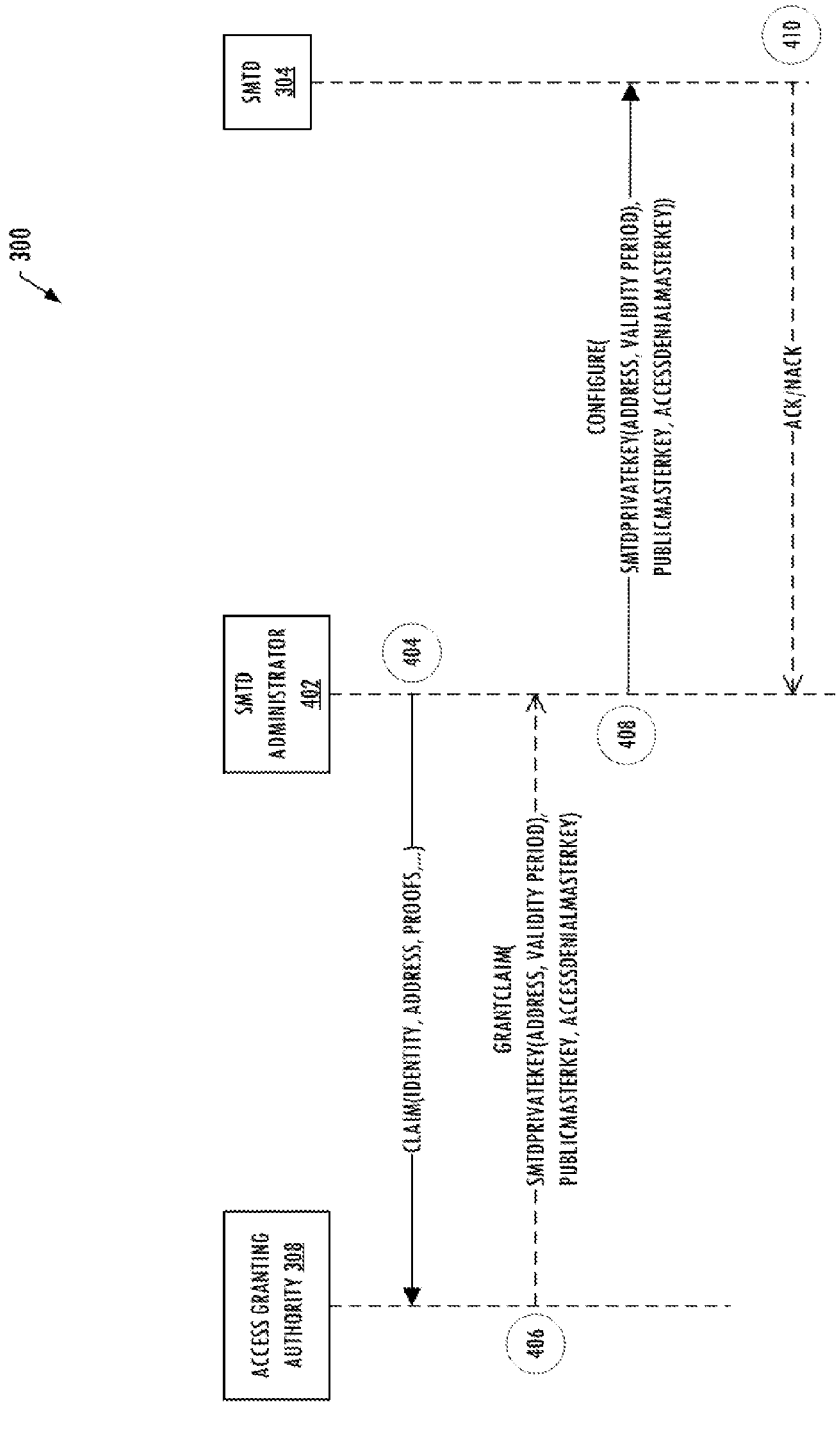
Figure 5:
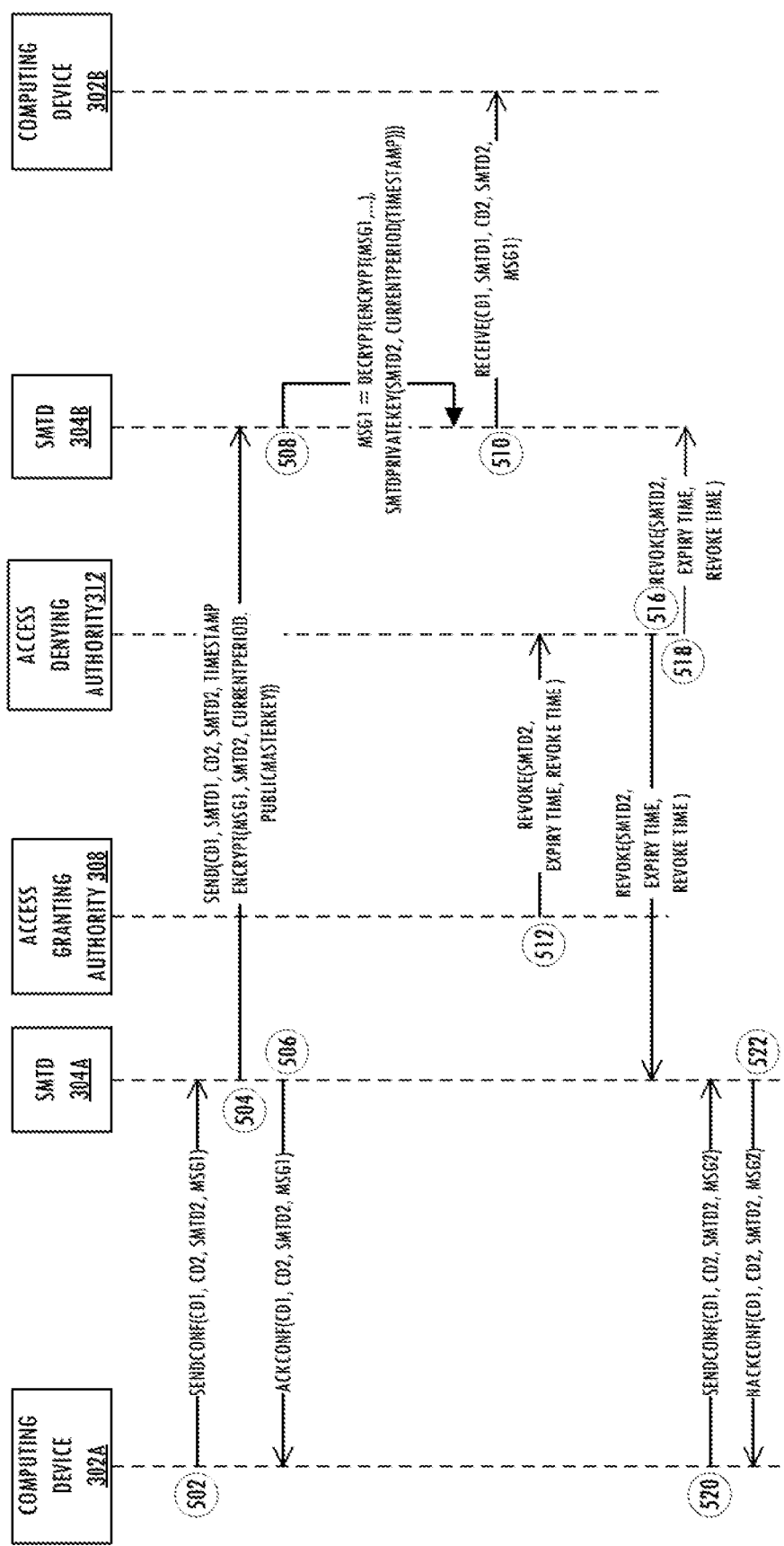
Figure 6:
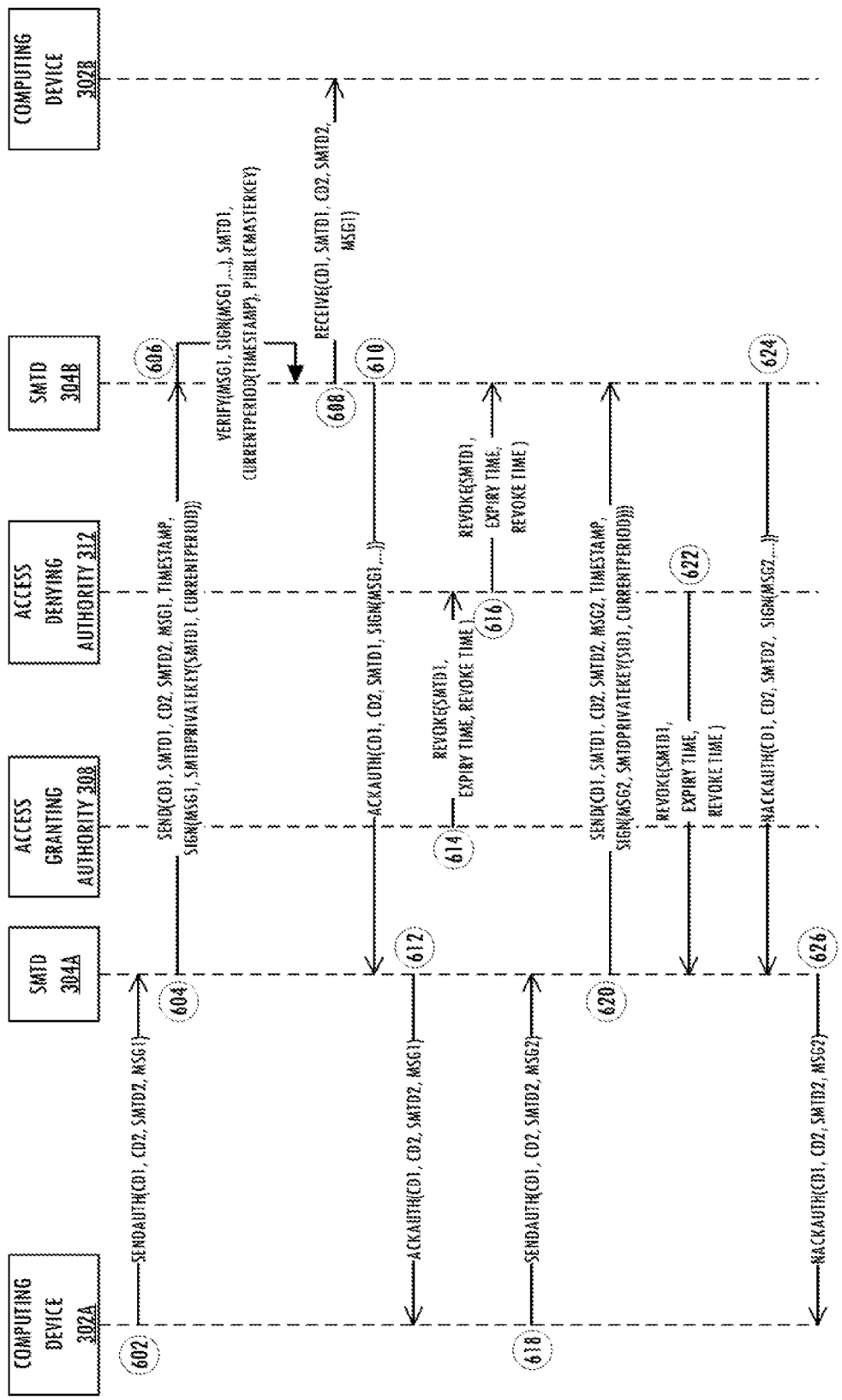

FIGS. 4, 5 and 6 more particularly illustrate various data transmissions as communicated within the system 300 to perform a number of functions or operations. FIG. 4 illustrates a process of configuring an SMTD 304. As shown, an owner of an SMTD or otherwise an SMTD administrator 402 may configure the SMTD as detailed by the data transmissions of FIG. 4. In particular, the SMTD administrator may provide a claim to the access granting authority 306 that includes credentials such as an identifier, an address and proof of identity, as shown at transmission 404. Based thereon, the access granting authority may grant access to the SMTD for sending and receiving confidential messages and thereby transmit a private decryption key unique to the SMTD. The private decryption key may be based on the address claimed and have a validity period. The access granting authority may also transmit a public master key and an access denial master key. The SMTD administrator may then manually configure the SMTD using the transmitted information. After the configuration is complete, the SMTD may communicate with other SMTDs within the system.

FIG. 5 illustrates a process for sending encrypted confidential messages (e.g., MSG1 and MSG2) from a source SMTD 304a (e.g., SMTD 106) to a destination SMTD 304b (e.g., SMTD 108). The SMTDs may be respectively connected to computing devices 302a (e.g., end-point computer 102), 302b (e.g., end-point operational system 104) for sending and receiving the message. In particular, at transmission 502, a confidential message may be generated by a source computing device and sent to the respectively connected source SMTD.

At transmission 504, the source SMTD may then compute an encryption key using the address of the destination SMTD (SMTD2), a current period as indicated by a timestamp and the public master key, and thereby encrypt the message. The source SMTD may further acknowledge receipt and successful transmission of the message at transmission 506. At transmission 508, the destination SMTD may receive and decrypt the encrypted message using the SMTD Private Key for that current period as received from the SMTD administrator 402. And the decrypted message may be further transmitted and received by the recipient's computing device 302b at transmission 510.

In some instances, the access granting authority 308 may transmit a message to the access denying authority 312 indicating revoked access for an SMTD. For example, at the transmission 512, the access granting authority informs the access denying authority of revoked access for the destination SMTD 302b, and the access denying authority thereby sends a revocation message to each of the SMTDs 302a, 302b that specifies the identity of the revoked SMTD, a expiry time and a revocation time, as shown by transmissions 516 and 518.

In these examples, if the access granting authority 308 has revoked the public key for the destination SMTD 304b for a given validity period, then the source SMTD 304a will refuse to send confidential messages to revoked destination SMTD. As shown in transmission 520 and 522, the source computing device 302a attempts to transmit a message the recipient computing device 302b via the revoked destination SMTD, and the source SMTD sends a negative acknowledgement to the computing device indicating the failed data transmission.

FIG. 6 illustrates a process for sending authenticated or signed messages (e.g., MSG1 and MSG2) from the source SMTD 304a to the destination SMTD 304b. In particular, at transmission 602, an authenticated message may be generated by a source computing device 302a and sent to the respectively connected source SMTD. In these examples, the source SMTD uses the private key to sign the message to be sent, as shown at transmission 604. At transmission 606, the destination SMTD computes the sources' public key using its address (SMTD1), current time period, and the public master key, and at transmission 608, the verified message is transmitted to the destination computing device 302b.

The destination SMTD 304b may send acknowledgement, to the source SMTD 304a, of receipt and successful transmission of the message to the destination computing device 302b, at transmission 610. Similarly, the source SMTD may send acknowledgement, to the source computing device 302a, of receipt and successful transmission of the message to the destination computing device, at transmission 612.

In some instances, the access granting authority 308 may transmit a message to the access denying authority 312 indicating revoked access for an SMTD. For example, at the transmission 614, the access granting authority informs the access denying authority of revoked access for the source SMTD 302a, and the access denying authority thereby sends a revocation message to each of the SMTDs 302a, 302b that specifies the identity of the revoked SMTD, an expiry time and a revocation time.

As shown by transmissions 616 and 618, in some examples, the destination SMTD 304b may receive the revocation message, but the source computing device 302a may generate another message that is sent to the source SMTD prior to the source SMTD 304a receiving notification of its' revoked access. Thus, the source SMTD may proceed with transmitting the message at transmission 620, and later receive the revocation message at transmission 622. If the destination SMTD receives an authenticated revocation message for the source SMTD for a particular validity period, it will refuse to accept messages signed by the address of the source SMTD for the revoked validity period. The destination SMTD may therefore transmit a negative acknowledgement to the source SMTD indicating the failed data transmission, and the source SMTD may thereby transmit a negative acknowledgement to the source computing device, at transmissions 624 and 626.

Figure 7:
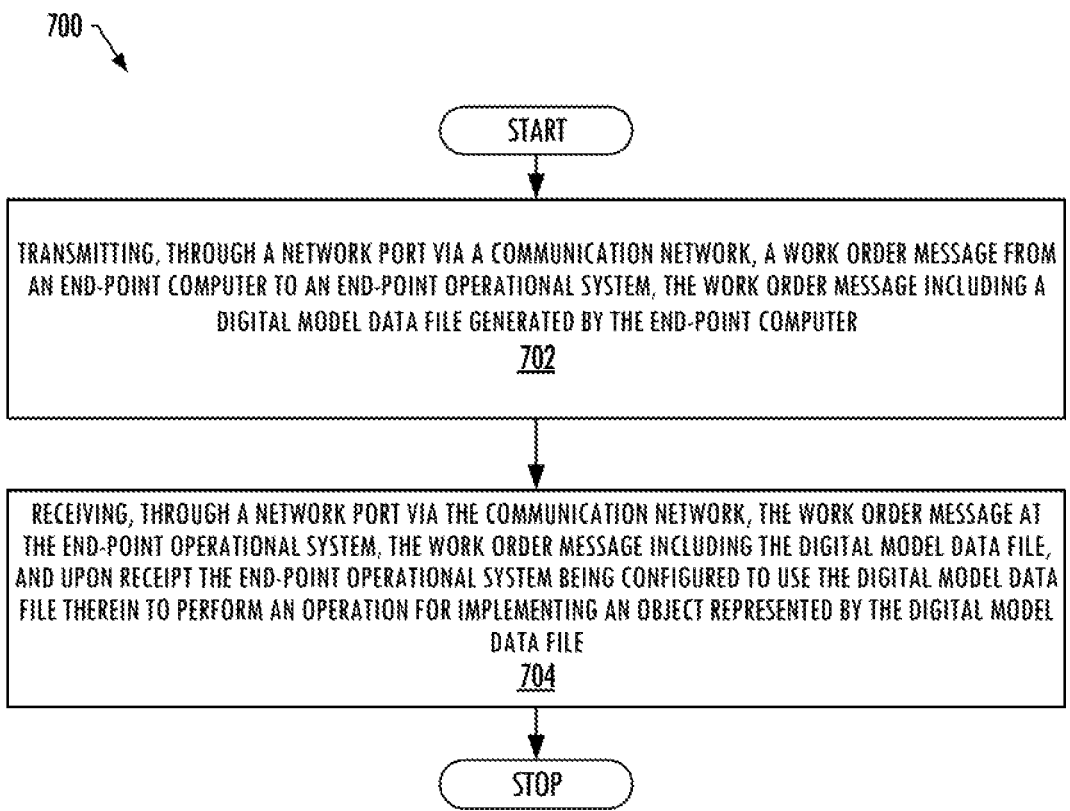
FIGS. 7, 8, 9 and 10 illustrate various operations of a method for providing secured data transmission, in accordance with an example implementation.

FIG. 7 illustrates a flowchart including various operations of a method 700 for secured data transmission and automated performance of operations by an operational system based thereon in which the method is performed at SMTDs respectively connected to an end-point computer configured to generate a digital model data file for transmission via the work order message, or an end-point operational system configured to receive the work order message including the digital model data file. As shown at block 702, the method may include transmitting, through a network port via a communication network, a work order message from the end-point computer to the end-point operational system in which the work order message includes a digital model data file generated by the end-point computer. The method may also include receiving, through a network port via a communication network, the work order message at the end-point operational system in which the work order message includes the digital model data file, as shown at block 704. The end-point operational system is configured to use the digital model data file therein to perform an operation for implementing an object represented by the digital model data file.

Figure 8:
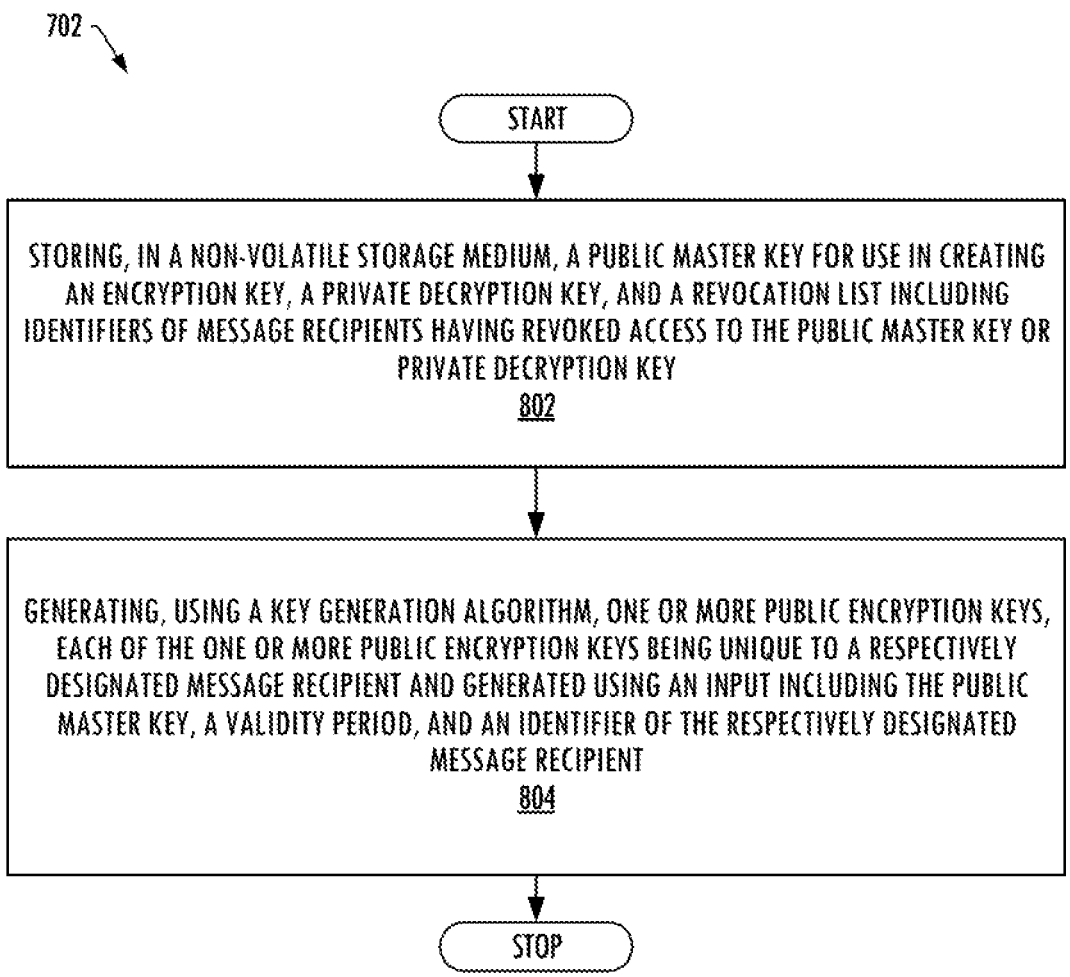

FIG. 8 illustrates a flowchart including various operations of the method step 702 of FIG. 7. As shown at block 802 the method step may include storing, in a non-volatile storage medium, a public master key for use in creating an encryption key, a private decryption key, and a revocation list including identifiers of message recipients having revoked access to the public master key or private decryption key. The method step may also include generating, using a key generation algorithm, one or more public encryption keys, as shown at block 804. Each of the one or more public encryption keys is unique to a designated message recipient and generated using an input including the public master key, a validity period, and an identifier of the designated message recipient.

Figure 9:
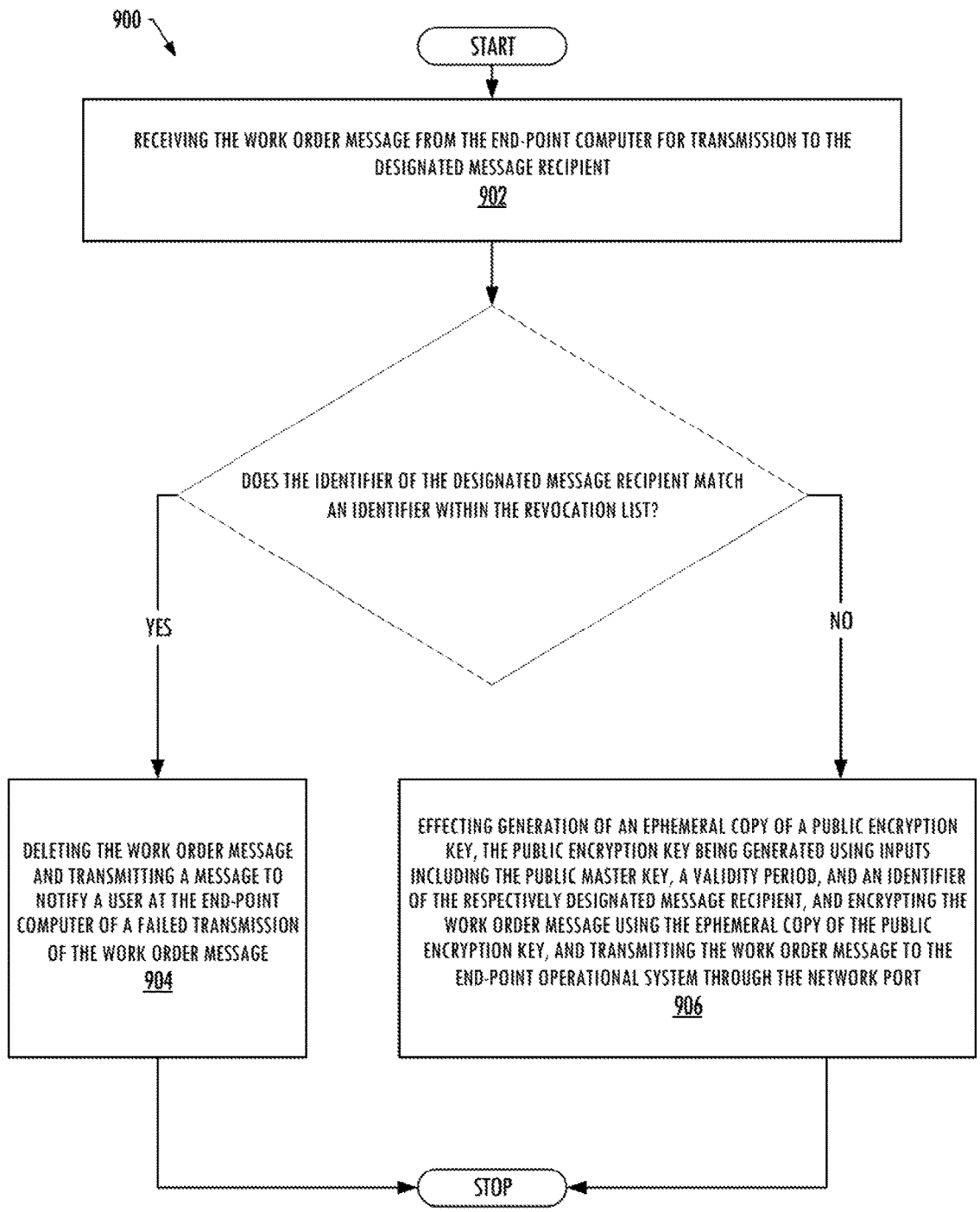

FIG. 9 illustrates a flowchart including various operations of the method step 702 of FIG. 7 for an SMTD connected to the end-point computer. As shown at block 902 the method step may include receiving the work order message from the end-point computer for transmission to the designated message recipient. If the identifier of the designated message recipient matches an identifier within the revocation list, the method step may also include deleting the work order message and transmitting a message to notify a user at the end-point computer of a failed transmission of the work order message, as shown at block 904. If the identifier of the designated message recipient does not match an identifier within the revocation list, the method step may also include effecting generation of an ephemeral copy of a public encryption key, encrypting the work order message using the ephemeral copy of the public encryption key, and transmitting the work order message to the end-point operational system through the network port, as shown at block 906. The public encryption key is generated using inputs including the public master key, a validity period, and an identifier of the designated message recipient.

Figure 10:
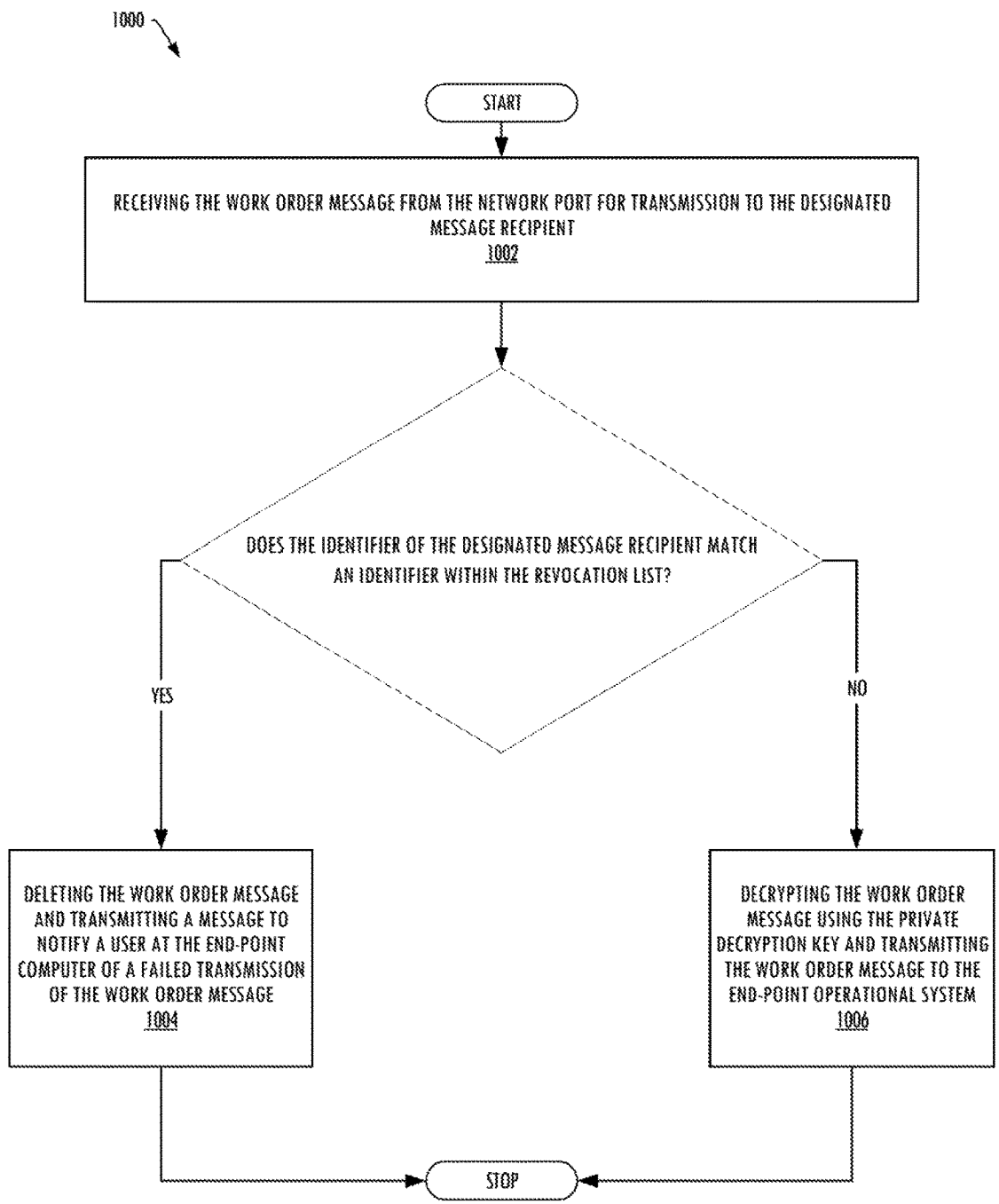

FIG. 10 illustrates a flowchart including various operations of the method step 704 of FIG. 7 for an SMTD connected to the end-point operational system. As shown at block 1002 the method step may include receiving the work order message from the network port for transmission to the designated message recipient. If the identifier of the designated message recipient matches an identifier within the revocation list, the method step may also include deleting the work order message and transmitting a message to notify a user at the end-point computer of a failed transmission of the work order message, as shown at block 1004. If the identifier of the designated message recipient does not match an identifier within the revocation list, the method step may also include decrypting the work order message using the private decryption key and transmitting the work order message to the end-point operational system, as shown at block 1006.

According to example implementations of the present disclosure, the system 100 and its subsystems and/or components including the end-point computer 102, end-point operational system 104, at least two secure message transmission device(s) (SMTD) 106, 108, access granting authority 110 and access denying authority 112 may be implemented by various means. Similarly, the example SMTD 200 and its subsystems and/or components may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 11:
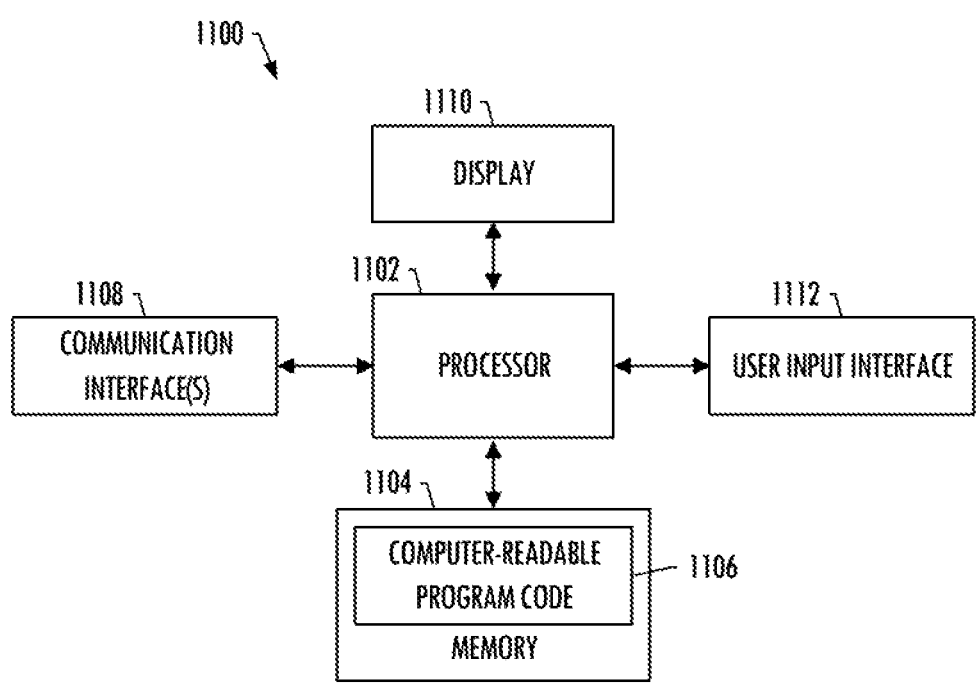
FIG. 11 illustrates an apparatus according to some example implementations.

FIG. 11 illustrates an apparatus 1100 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1102 (e.g., processor unit) connected to a memory 1104 (e.g., storage device).

The processor 1102 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1104 (of the same or another apparatus).

The processor 1102 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 1108 (e.g., communications unit) and/or one or more user interfaces one example of which may be the network port 204 of FIG. 2. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110 and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like.

The user input interfaces 1112 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1100 may include a processor 1102 and a computer-readable storage medium or memory 1104 coupled to the processor, where the processor is configured to execute computer-readable program code 1106 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for secured data transmission and automated performance of operations by an operational system based thereon, the system comprising: an end-point computer configured to generate a digital model data file for transmission via a work order message; an end-point operational system computer configured to receive the work order message including the digital model data file; and at least two secure message transmission devices (SMTDs) respectively connected to the end-point computer and the end-point operational system computer, each SMTD of the at least two STMDs including: a network port connected to a communication network to permit transmission of the work order message between the end-point computer and the end-point operational system computer via the communication network; a non-volatile storage medium storing a public master key for use in creating an encryption key, a private decryption key, a revocation list including identifiers of message recipients having revoked access to the public master key or private decryption key, and a secure messaging module; and a processor configured to execute the secure messaging module and a key generator module, the key generator module being configured to generate, using a key generation algorithm, one or more public encryption keys, each of the one or more public encryption keys being unique to a designated message recipient and generated using an input including the public master key, a validity period, and an identifier of the designated message recipient; and wherein, for the SMTD connected to the end-point computer, the secure messaging module is configured to: receive the work order message from the end-point computer for transmission to the designated message recipient, and if the identifier of the designated message recipient matches an identifier within the revocation list, delete the work order message and transmit a message to notify a user at the end-point computer of a failed transmission of the work order message, and if the identifier of the designated message recipient does not match an identifier within the revocation list, execute the key generator module to effect generation at the SMTD of an ephemeral copy of a public encryption key of the one or more public encryption keys, the public encryption key being generated using the key generator module and inputs including the public master key, a validity period, and an identifier of the designated message recipient, and encrypt the work order message using the ephemeral copy of the public encryption key of the one or more public encryption keys, and transmit the work order message to the end-point operational system computer via the network port; and wherein for the SMTD connected to the end-point operational system computer, the secure messaging module is configured to: receive the work order message from the network port for transmission to the designated message recipient, and if the identifier of the designated message recipient matches an identifier within the revocation list, delete the work order message and transmit a message to notify the user at the end-point computer of a failed transmission of the work order message, and if the identifier of the designated message recipient does not match an identifier within the revocation list, decrypt the work order message using the private decryption key stored locally in the storage medium and transmit the work order message to the end-point operational system computer, and upon receipt of the work order message, the end-point operational system computer being configured to use the digital model data file therein to perform an operation for implementing an object represented by the digital model data file.

2. The system of claim 1, wherein the digital model data file and the object represented thereby include a three-dimensional (3D) model for a structural part, the end-point operational system computer is a 3D-printer, and the end-point operational system computer being configured to perform the operation includes being configured to perform a 3D printing operation for creating the structural part from the 3D model.

3. The system of claim 1, wherein the digital model data file and the object represented thereby include a digital surface model and target and navigation information for a mission, the end-point operational system computer is an autonomous unmanned aerial vehicle, and the end-point operational system computer being configured to perform the operation includes being configured to perform an operation for navigating the autonomous unmanned aerial vehicle to the target for the mission in the digital surface model.

4. The system of claim 1, wherein the ephemeral copy of the public encryption key of the one or more public encryption keys is not a duplicate of any public encryption key of the one or more public encryption keys stored by a third-party directory of public encryption keys.

5. The system of claim 1, wherein the key generation algorithm is an asymmetric key generation algorithm, and the secure messaging module being configured to encrypt the work order message includes being configured to encrypt the work order message using an asymmetric encryption algorithm.

6. The system of claim 1, wherein a respective SMTD of the at least two SMTDs is operatively coupled to an access granting authority computer configured to: receive an identifier, an address and proof of identification associated with the respective SMTD; and based thereon, generate the private decryption key, the private decryption key being unique to the respective SMTD; and generate the public master key and an access denial master key for use in verifying revoked access to the public master key or the private decryption key, the private decryption key, public master key and access denial master key being configured for storage in the non-volatile memory.

7. The system of claim 6, wherein the respective SMTD of the at least two SMTDs is further operatively coupled to an access denying authority computer configured to: transmit a revocation message to the respective SMTD indicating at least one message recipient having revoked access to the public master key or private decryption key, the respective SMTD being thereby configured to: receive and verify validity of the revocation message based at least in part on the access denial master key, and in response to verifying validity of the revocation message, update the revocation list to include an identifier of the at least one message recipient.

8. A secure message transmission device (SMTD) for secured data transmission and automated performance of operations by an operational system based thereon, the SMTD being connected to an end-point computer configured to generate a digital model data file for transmission via a work order message, or an end-point operational system computer configured to receive the work order message including the digital model data file, the SMTD comprising: a network port connected to a communication network to permit transmission of the work order message between the end-point computer and the end-point operational system computer via the communication network; a non-volatile storage medium storing a public master key for use in creating an encryption key, a private decryption key, a revocation list including identifiers of message recipients having revoked access to the public master key or private decryption key, and a secure messaging module; and a processor configured to execute the secure messaging module and a key generator module, the key generator module being configured to generate, using a key generation algorithm, one or more public encryption keys, each of the one or more public encryption keys being unique to a designated message recipient and generated using an input including the public master key, a validity period, and an identifier of the designated message recipient; and wherein, for the SMTD connected to the end-point computer, the secure messaging module is configured to: receive the work order message from the end-point computer for transmission to the designated message recipient, and if the identifier of the designated message recipient matches an identifier within the revocation list, delete the work order message and transmit a message to notify a user at the end-point computer of a failed transmission of the work order message, and if the identifier of the designated message recipient does not match an identifier within the revocation list, effect generation at the SMTD of an ephemeral copy of a public encryption key of the one or more public encryption keys, the public encryption key being generated using the key generator module and inputs including the public master key, a validity period, and an identifier of the designated message recipient, and encrypt the work order message using the ephemeral copy of the public encryption key of the one or more public encryptions keys, and transmit the work order message to the end-point operational system through the network port; and wherein, for the SMTD connected to the end-point operational system computer, the secure messaging module is configured to: receive the work order message from the network port for transmission to the designated message recipient, and if the identifier of the designated message recipient matches an identifier within the revocation list, delete the work order message and transmit a message to notify the user at the end-point computer of a failed transmission of the work order message, and if the identifier of the designated message recipient does not match an identifier within the revocation list, decrypt the work order message using the private decryption key and transmit the work order message to the end-point operational system computer, and upon receipt of the work order message, the end-point operational system computer being configured to use the digital model data file therein to perform an operation for implementing an object represented by the digital model data file.

9. The secure message transmission device of claim 8, wherein the digital model data file and the object represented thereby include a three-dimensional (3D) model for a structural part, the end-point operational system computer is a 3D-printer, and the end-point operational system computer being configured to perform the operation includes being configured to perform a 3D printing operation for creating the structural part from the 3D model.

10. The secure message transmission device of claim 8, wherein the digital model data file and the object represented thereby include a digital surface model and target and navigation information for a mission, the end-point operational system computer is an autonomous unmanned aerial vehicle, and the end-point operational system computer being configured to perform the operation includes being configured to perform an operation for navigating the autonomous unmanned aerial vehicle to the target for the mission in the digital surface model.

11. The secure message transmission device of claim 8, wherein the ephemeral copy of the public encryption key of the one or more public encryption keys is not a duplicate of any public encryption key of the one or more public encryption keys stored by a third-party directory of public encryption keys.

12. The secure message transmission device of claim 8, wherein the key generation algorithm is an asymmetric key generation algorithm, and the secure messaging module being configured to encrypt the work order message includes being configured to encrypt the work order message using an asymmetric encryption algorithm.

13. The secure message transmission device of claim 8, wherein the SMTD is further connected to an access granting authority computer configured to: receive an identifier, an address and proof of identification associated with the respective SMTD; and based thereon, generate the private decryption key, the private decryption key being unique to the respective SMTD; and generate the public master key and an access denial master key for use in verifying revoked access to the public master key or the private decryption key, the private decryption key, public master key and access denial master key being configured for storage in the non-volatile memory.

14. The secure message transmission device of claim 13, wherein the SMTD is further connected to an access denying authority computer configured to: transmit a revocation message to the respective SMTD indicating at least one message recipient having revoked access to the public master key or private decryption key, the SMTD being thereby configured to: receive and verify validity of the revocation message based at least in part on the access denial master key, and in response to verifying validity of the revocation message, update the revocation list to include an identifier of the at least one message recipient.

15. A method for secured data transmission and automated performance of operations by an operational system based thereon, the method comprising, at a secure message transmission device (SMTD) connected to an end-point computer configured to generate a digital model data file for transmission via the work order message, or an end-point operational system computer configured to receive the work order message including the digital model data file, the method comprising: transmitting or receiving, through a network port and via a communication network, the work order message between the end-point computer and the end-point operational system computer including: storing, in a non-volatile storage medium, a public master key for use in creating an encryption key, a private decryption key, and a revocation list including identifiers of message recipients having revoked access to the public master key or private decryption key; generating, using a key generation algorithm, one or more public encryption keys, each of the one or more public encryption keys being unique to a designated message recipient and generated using an input including the public master key, a validity period, and an identifier of the designated message recipient; and wherein, for the SMTD connected to the end-point computer, the method further comprising: receiving the work order message from the end-point computer for transmission to the designated message recipient, and if the identifier of the designated message recipient matches an identifier within the revocation list, deleting the work order message and transmitting a message to notify a user at the end-point computer of a failed transmission of the work order message, and if the identifier of the designated message recipient does not match an identifier within the revocation list, effecting generation of an ephemeral copy of a public encryption key of the one or more public encryption keys, the public encryption key being generated using inputs including the public master key, a validity period, and an identifier of the designated message recipient, and encrypting the work order message using the ephemeral copy of the public encryption key of the one or more public encryption keys, and transmitting the work order message to the end-point operational system computer through the network port; and wherein, for the SMTD connected to the end-point operational system computer, the method further comprising: receiving the work order message from the network port for transmission to the designated message recipient, and if the identifier of the designated message recipient matches an identifier within the revocation list, deleting the work order message and transmitting a message to notify the user at the end-point computer of a failed transmission of the work order message, and if the identifier of the designated message recipient does not match an identifier within the revocation list, decrypting the work order message using the private decryption key and transmitting the work order message to the end-point operational system computer, and upon receipt of the work order message, the end-point operational system computer being configured to use the digital model data file therein to perform an operation for implementing an object represented by the digital model data file.

16. The method of claim 15, wherein the digital model data file and the object represented thereby include a three-dimensional (3D) model for a structural part, the end-point operational system computer is a 3D-printer, and the end-point operational system computer being configured to perform the operation includes being configured to perform a 3D printing operation for creating the structural part from the 3D model.

17. The method of claim 15, wherein the digital model data file and the object represented thereby include a digital surface model and target and navigation information for a mission, the end-point operational system computer is an autonomous unmanned aerial vehicle, and the end-point operational system computer being configured to perform the operation includes being configured to perform an operation for navigating the autonomous unmanned aerial vehicle to the target for the mission in the digital surface model.

18. The method of claim 15, wherein the ephemeral copy of the public encryption key of the one or more public encryption keys is not a duplicate of any public encryption key of the one or more public encryption keys stored by a third-party directory of public encryption keys.

19. The method of claim 15, wherein the key generation algorithm is an asymmetric key generation algorithm, and encrypting the work order message includes encrypting the work order message using an asymmetric encryption algorithm.

20. The method of claim 15 further comprising at an access granting authority computer connected to the SMTD: receiving an identifier, an address and proof of identification associated with the respective SMTD; and based thereon, generating the private decryption key, the private decryption key being unique to the respective SMTD; and generating the public master key and an access denial master key for use in verifying revoked access to the public master key or the private decryption key, the private decryption key, public master key and access denial master key being configured for storage in the respective SMTD.

21. The method of claim 20 further comprising at an access denying authority computer connected to the SMTD: transmitting a revocation message to the respective SMTD indicating at least one message recipient having revoked access to the public master key or private decryption key, and at the respective SMTD: receiving and verifying validity of the revocation message based at least in part on the access denial master key, and in response to verifying validity of the revocation message, updating the revocation list to include an identifier of the at least one message recipient.

* * * * *